US012744177B2

(12) United States Patent
Furuki et al.

(10) Patent No.: US 12,744,177 B2
(45) Date of Patent: Sep. 22, 2026

(54) X-RAY TUBE

(71) Applicant: HAMAMATSU PHOTONICS K.K., Hamamatsu (JP)

(72) Inventors: Hiroki Furuki, Hamamatsu (JP); Atsushi Ishii, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 124 days.

(21) Appl. No.: 18/862,360

(22) PCT Filed: Jan. 11, 2023

(86) PCT No.: PCT/JP2023/000469
§ 371 (c)(1),
(2) Date: Nov. 1, 2024

(87) PCT Pub. No.: WO2024/004239
PCT Pub. Date: Jan. 4, 2024

(65) Prior Publication Data

US 2025/0343020 A1 Nov. 6, 2025

(30) Foreign Application Priority Data

Jun. 28, 2022 (JP) ................................ 2022-103458

(51) Int. Cl.
*H01J 35/04* (2006.01)
*H01J 1/20* (2006.01)
(Continued)

(52) U.S. Cl.
CPC .............. *H01J 35/147* (2019.05); *H01J 1/20* (2013.01); *H01J 35/045* (2013.01);
(Continued)

(58) Field of Classification Search
None
See application file for complete search history.

(56) References Cited

U.S. PATENT DOCUMENTS 10,068,741 B2 * 9/2018 Takahashi ............... H01J 35/16
2016/0254116 A1 9/2016 Ukita et al.
(Continued)

FOREIGN PATENT DOCUMENTS

JP H5-144394 A 6/1993
JP H5-234549 A 9/1993
(Continued)

OTHER PUBLICATIONS

Machine translation of JP 2005-038825 A cited in the IDS filed Jan. 27, 2025 (Year: 2005).*
(Continued)

*Primary Examiner* — Thomas R Artman
(74) *Attorney, Agent, or Firm* — Faegre Drinker Biddle & Reath LLP

(57) ABSTRACT

An X-ray tube includes a housing; an electron gun that emits an electron beam inside the housing; and a target that generates an X-ray upon the electron beam being incident on the target inside the housing. The electron gun includes a cathode that releases electrons, and a focusing electrode that focuses the electrons onto the target as the electron beam. The focusing electrode has a tubular shape having an inner surface and an outer surface. The inner surface includes a first region, and a second region located on a target side with respect to the first region. An average roughness of the second region is smaller than an average roughness of the first region.

10 Claims, 4 Drawing Sheets

(51) Int. Cl.
*H01J 35/06* (2006.01)
*H01J 35/14* (2006.01)
*H01J 35/18* (2006.01)

(52) U.S. Cl.
CPC .......... *H01J 35/066* (2019.05); *H01J 35/186* (2019.05); *H01J 2235/06* (2013.01); *H01J 2235/205* (2013.01)

(56) References Cited

U.S. PATENT DOCUMENTS

| | | | | |
|---|---|---|---|---|
| 2017/0365439 | A1* | 12/2017 | Takahashi | H01J 35/16 |
| 2025/0343020 | A1* | 11/2025 | Furuki | H01J 35/065 |

FOREIGN PATENT DOCUMENTS

| | | | |
|---|---|---|---|
| JP | 2002-033066 | A | 1/2002 |
| JP | 2005-038825 | A | 2/2005 |
| JP | 2012-028132 | A | 2/2012 |
| JP | 2012-164427 | A | 8/2012 |
| JP | 6619916 | B1 | 12/2019 |
| JP | 2021-022428 | A | 2/2021 |
| JP | 7278464 | B1 | 5/2023 |
| WO | WO-2020/261339 | A1 | 12/2020 |

OTHER PUBLICATIONS

International Preliminary Report on Patentability mailed Jan. 9, 2025 for PCT/JP2023/000469.

* cited by examiner

X-RAY TUBE

TECHNICAL FIELD

The present disclosure relates to an X-ray tube.

BACKGROUND ART

An X-ray tube including a housing; an electron gun that emits an electron beam inside the housing; and a target that generates an X-ray upon the electron beam being incident on the target inside the housing, in which the electron gun includes a cathode that releases electrons, and a focusing electrode that focuses the electrons onto the target as the electron beam has been known (for example, refer to Patent Literature 1).

CITATION LIST

Patent Literature

Patent Literature 1: Japanese Patent No. 6619916

SUMMARY OF INVENTION

Technical Problem

In the X-ray tube described above, a negative high voltage may be applied to each of the cathode and the focusing electrode may be applied with respect to the target. In such a case, ensuring sufficient voltage withstand characteristics in the X-ray tube is very important in realizing stability of the operation of the X-ray tube.

An object of the present disclosure is to provide an X-ray tube capable of ensuring sufficient voltage withstand characteristics.

Solution to Problem

[1] An X-ray tube according to one aspect of the present disclosure is an "X-ray tube including: a housing; an electron gun that emits an electron beam inside the housing; and a target that generates an X-ray upon the electron beam being incident on the target inside the housing, in which the electron gun includes a cathode that releases electrons, and a focusing electrode that focuses the electrons onto the target as the electron beam, the focusing electrode has a tubular shape having an inner surface and an outer surface, the inner surface includes a first region, and a second region located on a target side with respect to the first region, and an average roughness of the second region is smaller than an average roughness of the first region."

In the X-ray tube described in [1], on the inner surface of the focusing electrode having a tubular shape, the average roughness of the second region located on the target side with respect to the first region is smaller than the average roughness of the first region located on a side opposite to the target with respect to the second region. Accordingly, even when a negative high voltage is applied to each of the cathode and the focusing electrode with respect to the target, a leakage current originating from the inner surface of the focusing electrode is less likely to occur. In addition, on the inner surface of the focusing electrode having a tubular shape, the average roughness of the first region located on a cathode side with respect to the second region is larger than the average roughness of the second region located on a side opposite to the cathode with respect to the first region. Accordingly, even when a cathode material is released from the cathode, the cathode material is likely to be captured in the first region, so that a leakage current originating from the cathode material adhering to an inner surface and the like of the housing is less likely to occur. As described above, according to the X-ray tube described in [1], sufficient voltage withstand characteristics can be ensured.

[2] An X-ray tube according to one aspect of the present disclosure may be "the X-ray tube described in [1], in which the inner surface includes an inner bottom surface facing the target side, and the inner bottom surface is the first region." According to the X-ray tube described in [2], since the cathode material is likely to be captured on the inner bottom surface, the occurrence of a leakage current originating from the cathode material adhering to the inner surface and the like of the housing can be more reliably suppressed.

[3] An X-ray tube according to one aspect of the present disclosure may be the "the X-ray tube described in [2], the inner surface further includes an inner side surface, a first side surface including an end portion on a cathode side in the inner side surface is the first region, and a second side surface including an end portion on the target side in the inner side surface is the second region." According to the X-ray tube described in [3], both the occurrence of a leakage current originating from the inner surface of the focusing electrode and the occurrence of a leakage current originating from the cathode material adhering to the inner surface and the like of the housing can be more reliably suppressed.

[4] An X-ray tube according to one aspect of the present disclosure may be "the X-ray tube described in [3], in which an average roughness of the second side surface is 0.4 μm or more and 1.0 μm or less, and an average roughness of the inner bottom surface is 1.0 μm or more and 3.2 μm or less." According to the X-ray tube described in [4], the second side surface from which a leakage current is less likely to occur, and the inner bottom surface on which the cathode material is likely to be captured can be suitably realized.

[5] An X-ray tube according to one aspect of the present disclosure may be the "X-ray tube described in [4], in which an average roughness of the first side surface is 1.0 μm or more and 1.6 μm or less." According to the X-ray tube described in [5], the first side surface on which the cathode material is likely to be captured can be suitably realized.

[6] An X-ray tube according to one aspect of the present disclosure may be "the X-ray tube described in any one of [3] to [5], in which an average roughness of the outer surface is smaller than the average roughness of the second side surface." According to the X-ray tube described in [6], since a leakage current originating from the outer surface of the focusing electrode is less likely to occur, sufficient voltage withstand characteristics can be more reliably ensured.

[7] An X-ray tube according to one aspect of the present disclosure may be the "X-ray tube described in [6], in which the average roughness of the outer surface is 0.05 μm or more and 0.4 μm or less." According to the X-ray tube described in [7], the outer surface from which a leakage current is less likely to occur can be suitably realized.

[8] An X-ray tube according to one aspect of the present disclosure may be the "X-ray tube described in [6] or [7], in which the outer surface includes a third region, and a fourth region located on the target side with respect to the third region, and an average roughness of the fourth region is smaller than an average roughness of the third region." According to the X-ray tube described in [8], the occurrence of a leakage current originating from the outer surface of the focusing electrode can be reliably suppressed.

[9] An X-ray tube according to one aspect of the present disclosure may be the "X-ray tube described in [8], in which the fourth region is a rounded region including an end portion on the target side of the outer surface." According to the X-ray tube described in [9], the occurrence of a leakage current originating from the outer surface of the focusing electrode can be more reliably suppressed.

[10] An X-ray tube according to one aspect of the present disclosure may be the "X-ray tube described in [8] or [9], in which the focusing electrode further includes an outer bottom surface facing a side opposite to the target, and an average roughness of the outer bottom surface is larger than the average roughness of the fourth region." According to the X-ray tube described in [10], since the cathode material is also likely to be captured on the outer bottom surface, the occurrence of a leakage current originating from the cathode material adhering to the inner surface and the like of the housing can be more reliably suppressed.

Advantageous Effects of Invention

According to the present disclosure, it is possible to provide the X-ray tube capable of ensuring sufficient voltage withstand characteristics.

DESCRIPTION OF EMBODIMENTS

Figure 1:
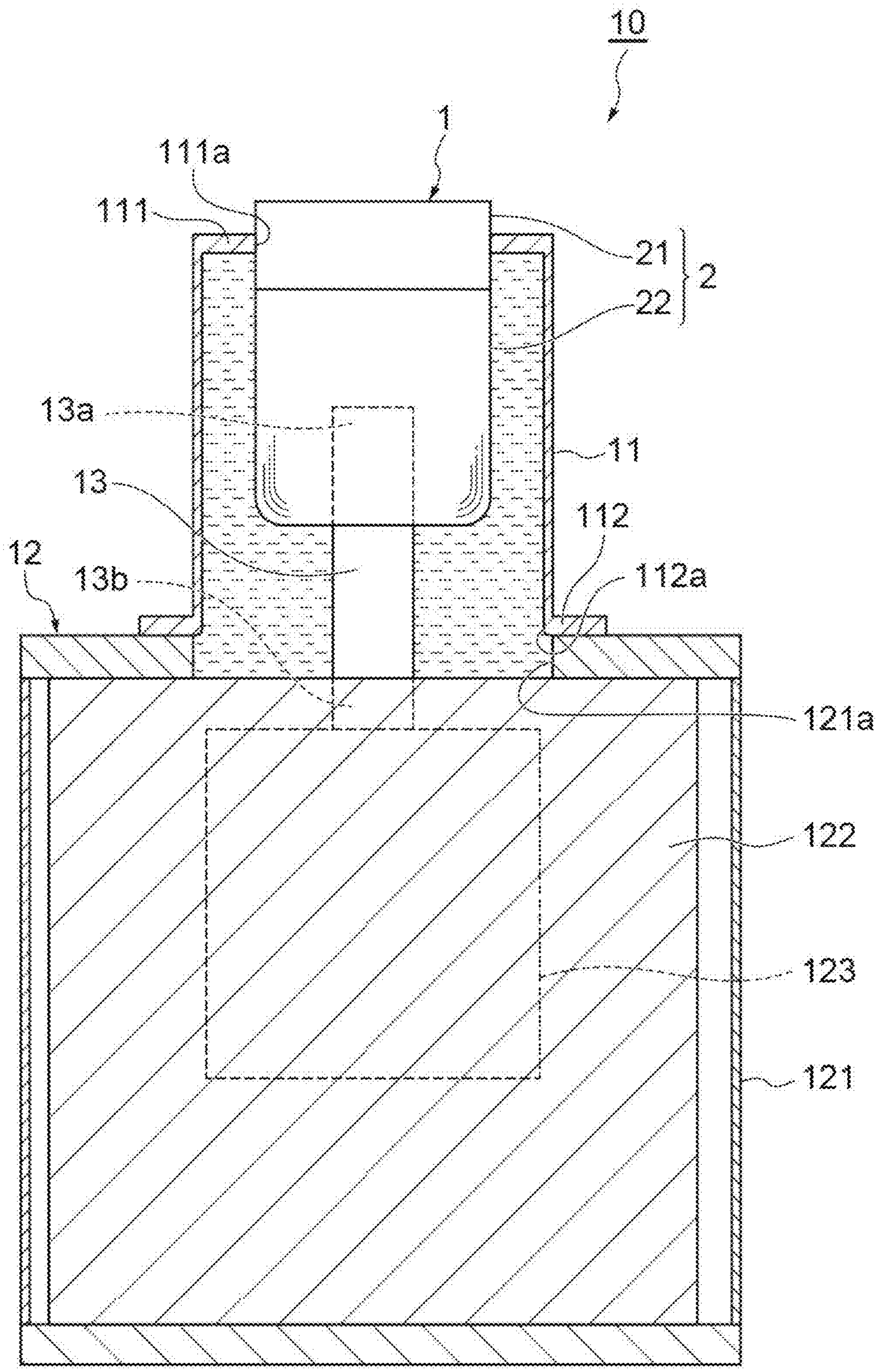
FIG. 1 is a cross-sectional view of an X-ray generation device including an X-ray tube of one embodiment.

Hereinafter, an embodiment of the present disclosure will be described in detail with reference to the drawings. Incidentally, in the drawings, the same or corresponding portions are denoted by the same reference signs, and duplicate descriptions will be omitted.

[Configuration of X-Ray Generation Device]

As shown in FIG. 1, an X-ray generation device 10 includes an X-ray tube 1, a holding unit 11, a power supply unit 12, and a power feeding unit 13. The X-ray generation device 10 is, for example, a microfocus X-ray source used for X-ray non-destructive inspection.

The holding unit 11 holds the X-ray tube 1. The holding unit 11 is formed of metal in a tubular shape. The X-ray tube 1 is attached to one end portion 111 of the holding unit 11 in a liquid tight manner. More specifically, a head 21 of a housing 2 of the X-ray tube 1 is attached to the one end portion 111 in a liquid tight manner in a state where the head 21 is disposed inside an opening 111*a* of the one end portion 111 and a bulb 22 of the housing 2 of the X-ray tube 1 is disposed inside the holding unit 11. The power supply unit 12 is attached to the other end portion 112 of the holding unit 11 in a liquid tight manner. Insulating oil is enclosed inside the holding unit 11.

The power supply unit 12 generates a high voltage to be applied to the X-ray tube 1. The power supply unit 12 includes a power supply casing 121, an insulating block 122, and a voltage boosting unit 123. The power supply casing 121 accommodates the insulating block 122 and the voltage boosting unit 123. The power supply casing 121 is formed of metal in a box shape. The voltage boosting unit 123 is embedded in the insulating block 122. The insulating block 122 is formed of an insulating material such as epoxy resin in a block shape. The voltage boosting unit 123 boosts a voltage, which is introduced from the outside of the X-ray generation device 10, to generate a high voltage.

The power feeding unit 13 supplies electric power from the power supply unit 12 to the X-ray tube 1. The power feeding unit 13 includes a plurality of wirings. The power feeding unit 13 extends from the voltage boosting unit 123 to the X-ray tube 1 through an opening 121*a* of the power supply casing 121 and an opening 112*a* of the other end portion 112 of the holding unit 11. One end portion 13*a* of the power feeding unit 13 is electrically connected to the X-ray tube 1. The other end portion 13*b* of the power feeding unit 13 is electrically connected to the voltage boosting unit 123.

[Configuration of X-Ray Tube]

Figure 2:
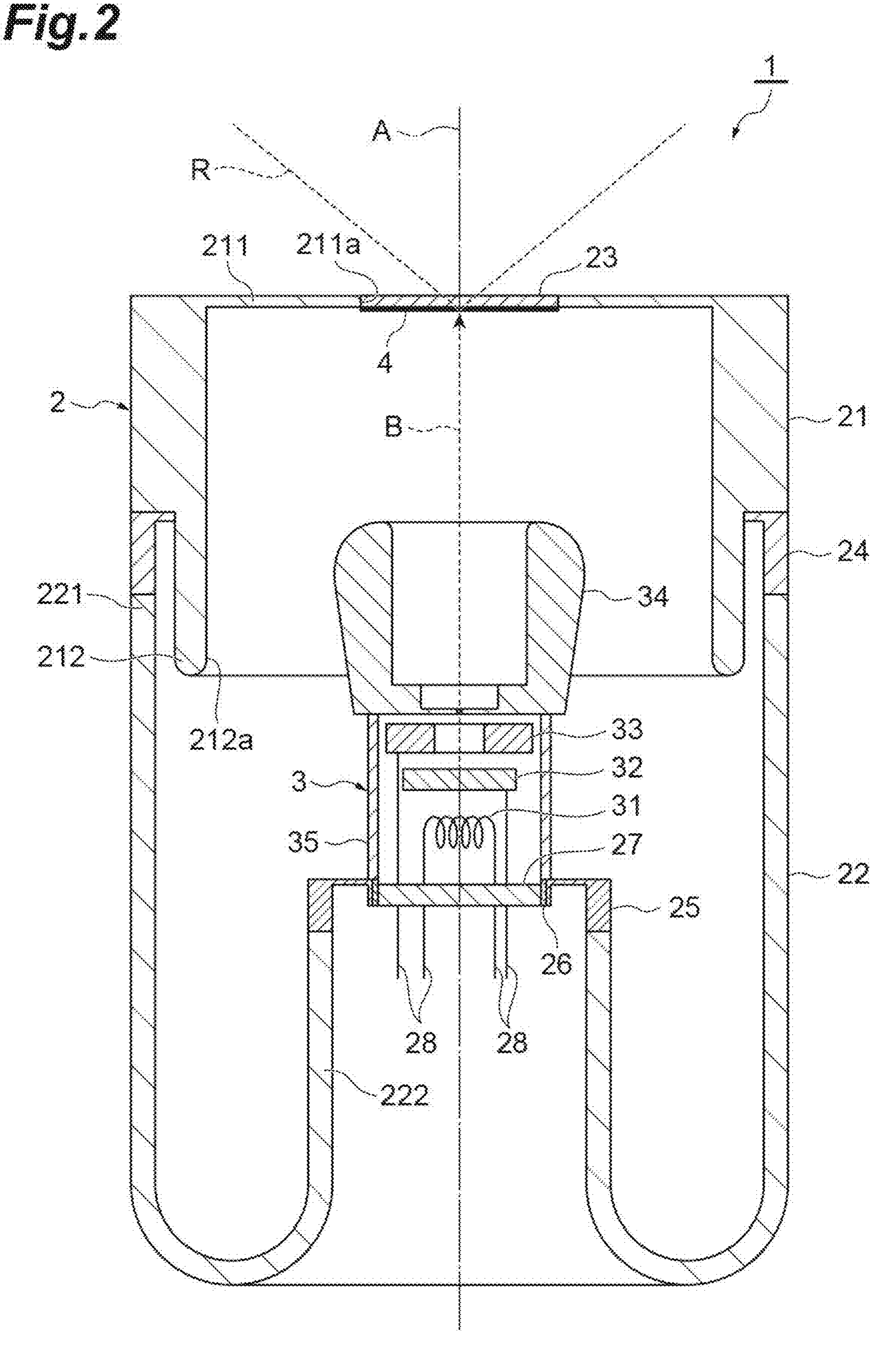
FIG. 2 is a cross-sectional view of the X-ray tube shown in FIG. 1.

As shown in FIG. 2, the X-ray tube 1 includes the housing 2, an electron gun 3, and a target 4. In the present embodiment, the X-ray tube 1 is configured as a sealed transmission type X-ray tube that does not require replacement of components and the like.

The housing 2 accommodates the electron gun 3 and the target 4. A space inside the housing 2 is a space that is evacuated. The housing 2 includes the head 21, the bulb 22, and a window member 23. The head 21 is formed of metal (for example, stainless steel, copper, copper alloy, iron alloy, or the like) in a tubular shape with a tube axis A as the center line. The bulb 22 is formed of an insulating material (for example, glass, ceramic, or the like) in a tubular shape with the tube axis A as the center line. The window member 23 is formed of an X-ray transmissive material (for example, beryllium, aluminum, diamond, or the like) in a plate shape with the tube axis A as the center line.

The window member 23 is airtightly attached to one end portion 211 of the head 21 in a state where an opening 211*a* of the one end portion 211 of the head 21 is closed. One end portion 221 of the bulb 22 is airtightly attached to the head 21 via a bulb flange 24 made of a metal such as Kovar, in a state where an opening 212*a* of the other end portion 212 of the head 21 is disposed inside the bulb 22. The other end portion of the bulb 22 is folded inward to form an inner tubular portion 222. A stem 27 is airtightly attached to an end portion of the inner tubular portion 222 via a bulb flange 25 and a stem flange 26 made of metal such as Kovar. The stem 27 is formed of an insulating material (for example, glass, ceramic, or the like) in a plate shape with the tube axis A as the center line.

The stem 27 is provided with a plurality of stem pins 28. Each of the stem pins 28 penetrates through the stem 27 in a state where the stem pins 28 are electrically insulated from one another and maintain airtightness. In the X-ray generation device 10, the one end portion 13*a* of the power feeding unit 13 (refer to FIG. 1) is electrically connected to the plurality of stem pins 28 inside the inner tubular portion 222.

The electron gun 3 emits an electron beam B inside the housing 2. The electron gun 3 is disposed on the stem 27 inside the housing 2. The electron gun 3 includes a heater 31, a cathode 32, a first grid electrode 33, a second grid electrode (focusing electrode) 34, and a support portion 35.

The heater 31 is composed of a filament that generates heat when generated. The cathode 32 releases electrons when heated by the heater 31. The first grid electrode 33 adjusts the amount of electrons released from the cathode 32. The corresponding stem pin 28 is electrically connected to each of the heater 31, the cathode 32, and the first grid electrode 33.

The second grid electrode 34 focuses the electrons, which have been released from the cathode 32 and passed through the first grid electrode 33, onto the target 4 as the electron beam B. The second grid electrode 34 also functions as an extraction electrode that forms an electric field for extracting the electrons constituting the electron beam B.

The support portion 35 is fixed to the stem flange 26, for example, by welding. The support portion 35 is formed of a conductive material (for example, stainless steel or the like) in a tubular shape with the tube axis A as the center line. The heater 31, the cathode 32, and the first grid electrode 33 are disposed inside the support portion 35. The second grid electrode 34 is attached to an end portion on an opposite side of the support portion 35 from the stem 27. The support portion 35 is electrically connected to the corresponding stem pin 28 via the stem flange 26, and also functions as a power feeding path for the second grid electrode 34.

The target 4 generates an X-ray R upon the electron beam B being incident on the target 4 inside the housing 2. The target 4 is disposed on an inner surface of the window member 23 on the tube axis A. In the present embodiment, the target 4 is a film body formed on the inner surface of the window member 23. The target 4 is formed of, for example, tungsten, molybdenum, copper, or the like in a film shape. The target 4 is electrically connected to the head 21. As one example, the target 4 and the head 21 are set to a ground potential.

In the X-ray tube 1 configured as described above, a negative high voltage is applied to the electron gun 3 by the power supply unit 12 with respect to the potential of the target 4 and the head 21. As one example, the power supply unit 12 applies a negative high voltage (for example, −10 kV to −500 kV) to each part of the electron gun 3 via the power feeding unit 13 and each of the stem pins 28 in a state where the target 4 and the head 21 are set to the ground potential. The electron beam B emitted from the electron gun 3 is focused onto the target 4 along the tube axis A. The X-ray R generated in an irradiation region of the electron beam B on the target 4 transmits through the target 4 and the window member 23 with the irradiation region as a focal point, and is emitted to the outside.

[Configuration of Second Grid Electrode]

Figure 3:
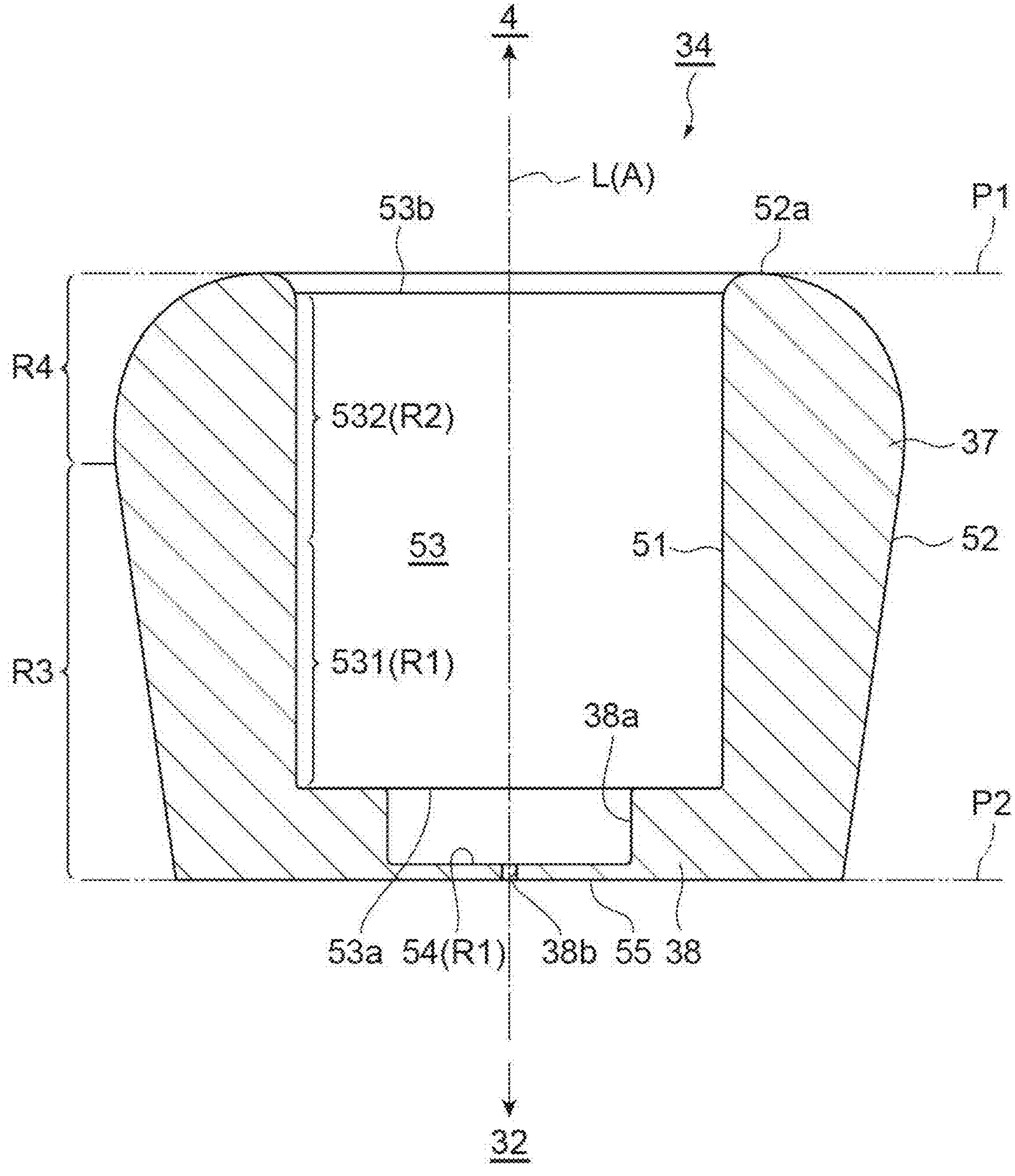
FIG. 3 is a cross-sectional view of a second grid electrode shown in FIG. 2.

As shown in FIG. 3, the second grid electrode 34 is formed of metal (for example, tungsten, molybdenum, tantalum, stainless steel, or the like) in a tubular shape. In the present embodiment, the second grid electrode 34 includes a side wall 37 and a bottom wall 38. The side wall 37 is formed in a cylindrical shape with the tube axis A as the center line. The bottom wall 38 is formed integrally with the side wall 37 at an end portion on a cathode 32 side of the side wall 37. A recess 38*a* and a through-hole 38*b* are formed in the bottom wall 38. The recess 38*a* is open to a target 4 side, and has a columnar outer shape with the tube axis A as the center line. The through-hole 38*b* is open to the target 4 side and the cathode 32 side in a bottom surface of the recess 38*a*, and has a columnar outer shape with the tube axis A as the center line. The second grid electrode 34 is disposed such that at least a part on the target 4 side of the second grid electrode 34 is accommodated inside the head 21. In other words, the second grid electrode 34 is disposed such that at least a part of an outer surface 52 to be described later faces an inner surface of the head 21. Incidentally, the side wall 37 and the bottom wall 38 may be separately formed and joined to each other.

The second grid electrode 34 has a tubular shape having an inner surface 51 and the outer surface 52. The inner surface 51 is a surface extending between a plane P1 and a plane P2 on a center line L side (namely, inside) of the second grid electrode 34 in the surfaces of the second grid electrode 34. The outer surface 52 is a surface extending between the plane P1 and the plane P2 on an opposite side of the second grid electrode 34 from a center line L (namely, outside) in the surfaces of the second grid electrode 34. The plane P1 is a plane passing through an end portion on the target 4 side of the second grid electrode 34. In other words, the plane P1 is a plane including an opening on the target 4 side of the second grid electrode 34 (in the present embodiment, an opening on the target 4 side of the side wall 37 having a cylindrical shape). The plane P2 is a plane passing through an end portion on the cathode 32 side of the second grid electrode 34. In other words, the plane P2 is a plane including an opening on the cathode 32 side of the second grid electrode 34 (in the present embodiment, an opening on the cathode 32 side of the through-hole 38*b*). Incidentally, in the present embodiment, the center line L of the second grid electrode 34 coincides with the tube axis A.

The inner surface 51 has an inner side surface 53. The inner side surface 53 is a surface extending along the center line L in the inner surface 51. The inner side surface 53 may have a gradient with respect to the center line L, and in that case, the gradient is 45 degrees or less (namely, a taper of 90 degrees or less). In the present embodiment, the inner side surface 53 is an inner side surface of the side wall 37, and the gradient of the inner side surface is 0 degrees. The inner surface 51 further has an inner bottom surface 54 facing the target 4 side. The inner bottom surface 54 is a bottom surface facing the target 4 in the inner surface 51, and is a bottom surface farthest from the target 4 (in other words, closest to the cathode 32). In the present embodiment, the inner bottom surface 54 is the bottom surface of the recess 38*a*.

The inner surface 51 includes a first region R1 and a second region R2 located on the target 4 side with respect to the first region R1. The first region R1 is the inner bottom surface 54 and a first side surface 531 including an end portion 53*a* on the cathode 32 side in the inner side surface 53. The second region R2 is a second side surface 532 including an end portion 53*b* on the target 4 side in the inner side surface 53. The outer surface 52 includes a third region R3 and a fourth region R4 located on the target 4 side with respect to the third region R3. The third region R3 is a surface having a gradient of 45 degrees or less with respect to the center line L (namely, a taper of 90 degrees or less) in the outer surface 52. In the present embodiment, the third region R3 is a tapered surface that widens as the third region R3 extends toward the target 4 side. The fourth region R4 is a rounded region including an end portion 52*a* on the target 4 side of the outer surface 52. More specifically, the fourth region R4 is a rounded chamfered surface extending from the end portion 52*a* having an annular shape toward the outside and the cathode 32 side in a state where the rounded chamfered surface protrudes outwardly. The second grid electrode 34 further has an outer bottom surface 55 facing a side opposite to the target 4. In the present embodiment, the outer bottom surface 55 is a surface on an opposite side of the bottom wall 38 of the second grid electrode 34 from the inner bottom surface 54.

An average roughness of the second region R2 is smaller than an average roughness of the first region R1. The average roughness of the first region R1 is 1.0 μm or more and 3.2 μm or less. The average roughness of the second region R2 is 0.4 μm or more and 1.0 μm or less. In more detail, an average roughness of the inner bottom surface 54 that is the first region R1 is 1.0 μm or more and 3.2 μm or less. An average roughness of the first side surface 531 that is the first region R1 is 1.0 μm or more and 1.6 μm or less. An average roughness of the second side surface 532 that is the second region R2 is 0.4 μm or more and 1.0 μm or less. An average roughness of the outer surface 52 is smaller than the average roughness of the second side surface 532. The average roughness of the outer surface 52 is 0.05 μm or more and 0.4 μm or less. An average roughness of the fourth region R4 is smaller than an average roughness of the third region R3. An average roughness of the outer bottom surface 55 is larger than the average roughness of the fourth region R4. Incidentally, the average roughness means an arithmetic mean roughness Ra. A contact surface roughness meter, a laser microscope, a white light interferometer, or the like can be used to measure the Ra. As one example, a contact surface roughness meter is preferable for measuring the Ra of the inner surface 51, and a white light interferometer or a laser microscope is preferable for measuring the Ra of the outer surface 52. Here, an average roughness of a region α being smaller than an average roughness of a region β means that the region α has an average roughness less than a predetermined value and the region β has an average roughness equal to or larger than the predetermined value. In this case, the value of the average roughness in the region α may vary or may be constant as long as the value of the average roughness is less than the predetermined value. Similarly, the value of the average roughness in the region β may vary or may be constant as long as the value of the average roughness is equal to or larger than the predetermined value. In addition, the average roughness of the region α being larger than the average roughness of the region β means that the region α has an average roughness equal to or larger than a predetermined value and the region β has an average roughness less than the predetermined value. In this case, the value of the average roughness in the region α may vary or may be constant as long as the value of the average roughness is equal to or larger than the predetermined value. Similarly, the value of the average roughness in the region β may vary or may be constant as long as the value of the average roughness is less than the predetermined value. In the present embodiment, the value of the average roughness of the inner surface 51 varies to gradually increase from the end portion 53*b* to the end portion 53*a*.

The second grid electrode 34 having the above-described average roughnesses is manufactured, as one example, as follows. First, in an electrolyte, the surface of a cathode having a cup shape is set to face the outer surface 52 of the second grid electrode 34 which is electrically connected to an anode. Meanwhile, the cathode is set not to face the inner surface 51 of the second grid electrode 34. By performing electrolytic polishing in this state, the second grid electrode 34 having the above-described average roughnesses is manufactured. Incidentally, before electrolytic polishing is performed, the outer surface 52 of the second grid electrode 34 may be subjected to mechanical polishing such as buffing.

[Actions and Effects]

In the X-ray tube 1, on the inner surface 51 of the second grid electrode 34 having a tubular shape, the average roughness of the second region R2 located on the target 4 side with respect to the first region R1 is smaller than the average roughness of the first region R1 located on the side opposite to the target 4 with respect to the second region R2. Accordingly, even when a negative high voltage is applied to each of the cathode 32 and the second grid electrode 34 with respect to the target 4, a leakage current originating from the inner surface 51 of the second grid electrode 34 is less likely to occur. In addition, on the inner surface 51 of the second grid electrode 34 having a tubular shape, the average roughness of the first region R1 located on the cathode 32 side with respect to the second region R2 is larger than the average roughness of the second region R2 located on the side opposite to the cathode 32 with respect to the first region R1. Accordingly, even when the cathode material is released from the cathode 32, the cathode material is likely to be captured in the first region R1, so that the reach and adhesion of the cathode material to the inner surface and the like of the housing 2 is suppressed, and a leakage current originating from the cathode material adhering to the inner surface and the like of the housing 2 is less likely to occur. As described above, according to the X-ray tube 1, sufficient voltage withstand characteristics can be ensured.

In addition, even when a target material is released from the target 4, the target material is likely to be captured in the first region R1. By capturing the cathode material and/or the target material in the first region R1, the occurrence of a situation where the cathode material and/or the target material falls off into the housing 2 and becomes foreign matter can be suppressed. Therefore, a leakage current originating from the foreign matter is less likely to occur. As described above, according to the X-ray tube 1, sufficient voltage withstand characteristics can be ensured.

In the X-ray tube 1, the inner bottom surface 54 of the inner surface 51, which faces the target 4 side, is configured as the first region R1. Accordingly, the cathode material is likely to be captured on the inner bottom surface 54, so that the occurrence of a leakage current originating from the cathode material adhering to the inner surface and the like of the housing 2 can be more reliably suppressed.

In the X-ray tube 1, the first side surface 531 including the end portion 53*a* on the cathode 32 side in the inner side surface 53 is configured as the first region R1, and the second side surface 532 including the end portion 53*b* on the target 4 side in the inner side surface 53 is configured as the second region R2. Accordingly, both the occurrence of a leakage current originating from the inner surface 51 of the second grid electrode 34 and the occurrence of a leakage current originating from the cathode material adhering to the inner surface and the like of the housing 2 can be more reliably suppressed.

In the X-ray tube 1, the average roughness of the second side surface 532 is 0.4 μm or more and 1.0 μm or less, and the average roughness of the inner bottom surface 54 is 1.0 μm or more and 3.2 μm or less. Accordingly, the second side surface 532 from which a leakage current is less likely to occur, and the inner bottom surface 54 on which the cathode material is likely to be captured can be suitably realized.

In the X-ray tube 1, the average roughness of the first side surface 531 is 1.0 μm or more and 1.6 μm or less. Accordingly, the first side surface 531 on which the cathode material is likely to be captured can be suitably realized.

In the X-ray tube 1, the average roughness of the outer surface 52 is smaller than the average roughness of the second side surface 532. Accordingly, a leakage current originating from the outer surface 52 of the second grid electrode 34 is less likely to occur, so that sufficient voltage withstand characteristics can be more reliably ensured.

In the X-ray tube 1, the average roughness of the outer surface 52 is 0.05 μm or more and 0.4 μm or less. Accordingly, the outer surface 52 from which a leakage current is less likely to occur can be suitably realized.

In the X-ray tube 1, on the outer surface 52, the average roughness of the fourth region R4 located on the target 4 side with respect to the third region R3 is smaller than the average roughness of the third region R3 located on the cathode 32 side with respect to the fourth region R4. Accordingly, the occurrence of a leakage current originating from the outer surface 52 of the second grid electrode 34 can be reliably suppressed.

In the X-ray tube 1, the fourth region R4 is a rounded region including the end portion 52*a* on the target 4 side of the outer surface 52. Accordingly, the occurrence of a leakage current originating from the outer surface 52 of the second grid electrode 34 can be more reliably suppressed.

In the X-ray tube 1, the average roughness of the outer bottom surface 55 facing the side opposite to the target 4 is larger than the average roughness of the fourth region R4. Accordingly, the cathode material is likely to be captured on the outer bottom surface 55, so that the occurrence of a leakage current originating from the cathode material adhering to the inner surface and the like of the housing 2 can be more reliably suppressed.

Here, the reason that the average roughness of the inner surface 51 is set to 0.4 μm or more and 3.2 μm or less and the average roughness of the outer surface 52 is set to 0.05 μm or more and 0.4 μm or less will be described in detail.

As described above, in the X-ray tube 1, a negative high voltage is applied to each of the cathode 32 and the second grid electrode 34 with respect to the target 4. If the value (absolute value) of the high voltage increases, a leakage current flowing to a location other than between "the cathode 32 of the electron gun 3" and "the target 4" increases. Examples of the leakage current include a leakage current caused by a discharge occurring between "portions of the electron gun 3 other than the cathode 32 (mainly the second grid electrode 34)" and "the target 4 and the head 21 that are anodes", a leakage current caused by a discharge occurring between "foreign matter" and "the target 4 and the head 21 that anodes", and a leakage current caused by a discharge occurring between "foreign matter" and "the electron gun 3". If the leakage current increases, an anode current increases even when a tube current is controlled to be constant. The tube current is a current flowing between the cathode 32 and the target 4, and is, for example, a current that is calculated based on a voltage applied to the first grid electrode 33. The anode current is a current flowing between the electron gun 3 and "the target 4 and the head 21 that are anodes" (namely, the sum of the tube current and the leakage current), and is, for example, a current measured by an ammeter electrically connected to the head 21.

In the X-ray tube 1, when the anode current is larger than a predetermined threshold value, it is determined that a discharge has occurred, and the operation of the X-ray tube 1 is stopped. For that reason, if the leakage current increases, the anode current is likely to be larger than the threshold value due to fluctuations in tube current or the like, and as a result, even though no discharge occurs, the operation of the X-ray tube 1 is likely to be stopped, which is a risk.

In addition, if the leakage current increases, an X-ray is radiated from the target 4 and/or the head 21 due to the incidence of electrons caused by the leakage current. For that reason, the X-ray R with which an inspection object is irradiated has a plurality of focal points, and as a result, an X-ray image of the inspection object becomes blurred, which is a risk. In addition, background noise in the X-ray R with which the inspection object is irradiated increases, and as a result, the contrast in an X-ray image of the inspection object decreases, which is a risk.

Therefore, in the X-ray tube 1, it is important to prevent the value of the leakage current from reaching a magnitude leading to the above-described problems. By setting the average roughness of the inner surface 51 to 3.2 μm or less and the average roughness of the outer surface 52 to 0.4 μm or less, an increase in the value of the leakage current to the extent leading to the above-described problems can be suppressed.

Meanwhile, if the value of the leakage current decreases too much, it becomes difficult to obtain the effect of gas being released from the inner surface of the head 21 due to electrons caused by the leakage current colliding with the inner surface of the head 21. By setting the average roughness of the inner surface 51 to 0.4 μm or more and the average roughness of the outer surface 52 to 0.05 μm or more, a reduction in leakage current to the extent that the effect of gas release cannot be obtained can be suppressed. In addition, in a sealed X-ray tube as in the present embodiment, the released gas can be removed by a getter disposed inside the X-ray tube, and in an open X-ray tube, the released gas can be removed by a pump disposed outside the X-ray tube.

Modification Examples

Figure 4:
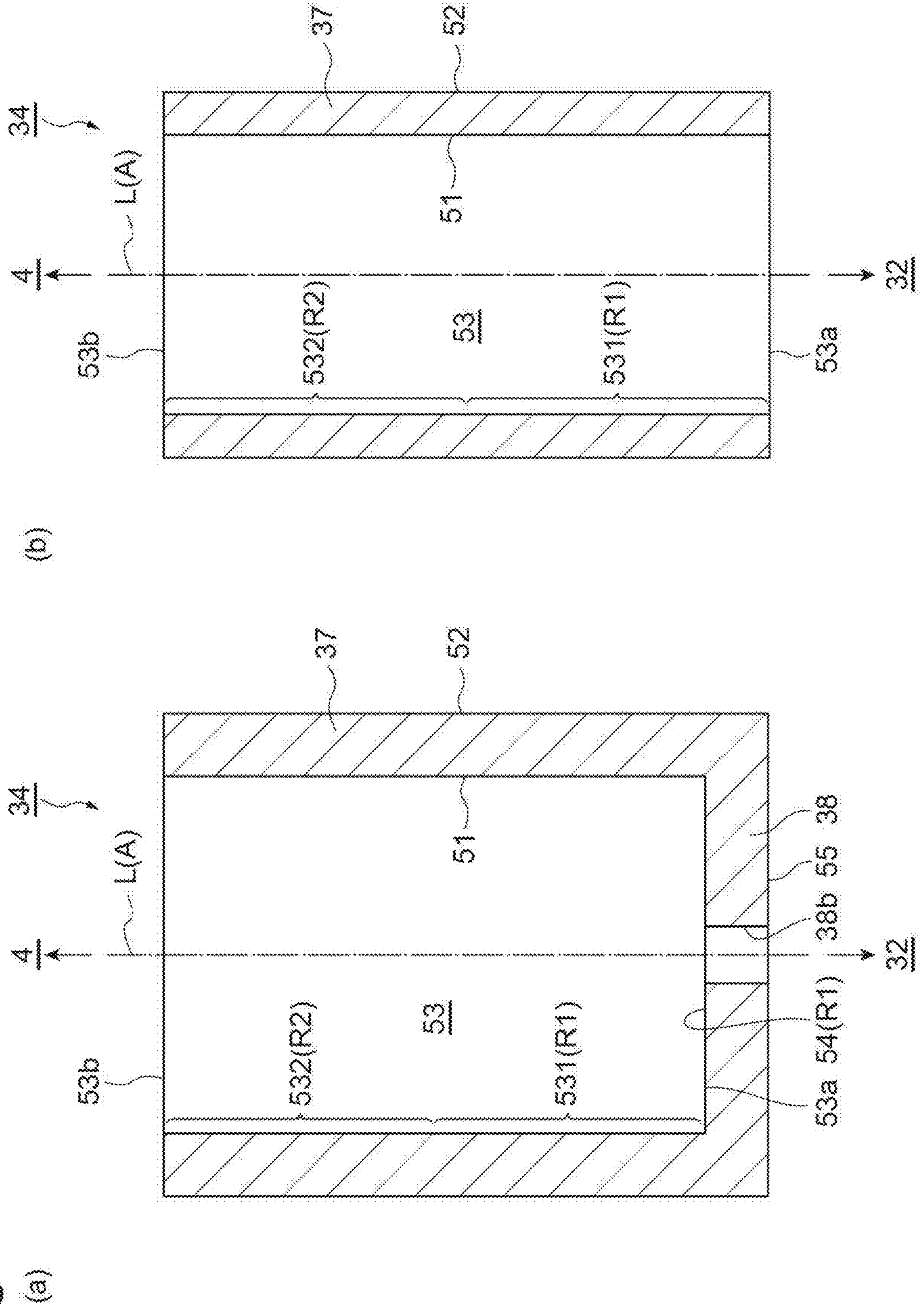
FIG. 4 is a cross-sectional view of a grid electrode of a modification example.

The present disclosure is not limited to the above-described embodiment. For example, as shown in (a) of FIG. 4, the recess 38*a* (refer to FIG. 3) may not be formed on the bottom wall 38 of the second grid electrode 34. In this case, the inner bottom surface 54 that is the first region R1 is a surface on the target 4 side of the bottom wall 38. In addition, as shown in (b) of FIG. 4, the second grid electrode 34 may include the side wall 37, but may not include the bottom wall 38. In each of the second grid electrodes 34, on the inner surface 51 of the second grid electrode 34 having a tubular shape, the average roughness of the second region R2 located on the target 4 side with respect to the first region R1 is smaller than the average roughness of the first region R1 located on the side opposite to the target 4 with respect to the second region R2. In other words, on the inner surface 51 of the second grid electrode 34 having a tubular shape, the average roughness of the first region R1 located on the cathode 32 side with respect to the second region R2 is larger than the average roughness of the second region R2 located on the side opposite to the cathode 32 with respect to the first region R1.

In addition, on the inner surface 51 of the second grid electrode 34 having a tubular shape, as long as the second region R2 is located on the target 4 side with respect to the first region R1, the first region R1 may not be a region including the end portion 53*a* on the cathode 32 side of the inner side surface 53, and the second region R2 may not be a region including the end portion 53*b* on the target 4 side of the inner side surface 53. In addition, on the outer surface 52 of the second grid electrode 34 having a tubular shape, as long as the fourth region R4 is located on the target 4 side with respect to the third region R3, the fourth region R4 may not be a rounded region including the end portion 52*a* on the target 4 side of the outer surface 52. In addition, the first region R1 and the second region R2 may be separated from each other. Similarly, the third region R3 and the fourth region R4 may be separated from each other.

The X-ray tube 1 may be configured as a sealed reflection type X-ray tube. Alternatively, the X-ray tube 1 may be configured as an open transmission type X-ray tube or an open reflection type X-ray tube. The open transmission type or open reflection type X-ray tube is configured such that the housing can be opened, and is an X-ray tube that allows components (for example, the window member and each part of the electron gun) to be replaced. In an X-ray generation device including an open transmission type or open reflection type X-ray tube, the space in the housing is evacuated by a vacuum pump.

REFERENCE SIGNS LIST

1: X-ray tube, 2: housing, 3: electron gun, 4: target, 32: cathode, 34: second grid electrode (focusing electrode), 51: inner surface, 52: outer surface, 52*a*: end portion, 53: inner side surface, 53*a*, 53*b*: end portion, 54: inner bottom surface, 55: outer bottom surface, 531: first side surface, 532: second side surface, R1: first region, R2: second region, R3: third region, R4: fourth region.

The invention claimed is:

1. An X-ray tube comprising:
a housing;
an electron gun that emits an electron beam inside the housing; and
a target that generates an X-ray upon the electron beam being incident on the target inside the housing,
wherein the electron gun includes a cathode that releases electrons, and a focusing electrode that focuses the electrons onto the target as the electron beam,
the focusing electrode has a tubular shape having an inner surface and an outer surface,
the inner surface includes a first region, and a second region located on a target side with respect to the first region, and
an average roughness of the second region is smaller than an average roughness of the first region.

2. The X-ray tube according to claim 1,
wherein the inner surface includes an inner bottom surface facing the target side, and
the inner bottom surface is the first region.

3. The X-ray tube according to claim 2,
wherein the inner surface further includes an inner side surface,
a first side surface including an end portion on a cathode side in the inner side surface is the first region, and
a second side surface including an end portion on the target side in the inner side surface is the second region.

4. The X-ray tube according to claim 3,
wherein an average roughness of the second side surface is 0.4 μm or more and 1.0 μm or less, and
an average roughness of the inner bottom surface is 1.0 μm or more and 3.2 μm or less.

5. The X-ray tube according to claim 4,
wherein an average roughness of the first side surface is 1.0 μm or more and 1.6 μm or less.

6. The X-ray tube according to claim 3,
wherein an average roughness of the outer surface is smaller than the average roughness of the second side surface.

7. The X-ray tube according to claim 6,
wherein the average roughness of the outer surface is 0.05 μm or more and 0.4 μm or less.

8. The X-ray tube according to claim 6,
wherein the outer surface includes a third region, and a fourth region located on the target side with respect to the third region, and
an average roughness of the fourth region is smaller than an average roughness of the third region.

9. The X-ray tube according to claim 8,
wherein the fourth region is a rounded region including an end portion on the target side of the outer surface.

10. The X-ray tube according to claim 8,
wherein the focusing electrode further includes an outer bottom surface facing a side opposite to the target, and
an average roughness of the outer bottom surface is larger than the average roughness of the fourth region.

* * * * *